United States Patent [19]

Oh

[11] Patent Number: 4,716,329
[45] Date of Patent: Dec. 29, 1987

[54] ARMATURE CONSTRUCTION FOR ELIMINATING ARMATURE REACTION IN ELECTRIC ROTATING MACHINES

[75] Inventor: Sang S. Oh, Seoul, Rep. of Korea

[73] Assignee: Jang Kyun Oh, Seoul, Rep. of Korea; a part interest

[21] Appl. No.: 162,571

[22] Filed: Jun. 24, 1980

Related U.S. Application Data

[63] Continuation of Ser. No. 874,664, Feb. 2, 1979, abandoned, which is a continuation-in-part of Ser. No. 321,554, Jan. 5, 1973, abandoned.

[51] Int. Cl.$^4$ .............................................. H02K 1/10
[52] U.S. Cl. ..................................... 310/183; 310/212
[58] Field of Search ............... 310/182, 184, 211, 212, 310/43

[56] References Cited

U.S. PATENT DOCUMENTS

| | | | |
|---|---|---|---|
| 1,717,289 | 6/1929 | Weiler | 310/183 UX |
| 2,296,776 | 9/1942 | Douglas | 310/212 X |
| 3,891,876 | 6/1975 | Herr et al. | 310/43 |

*Primary Examiner*—Donovan F. Duggan
*Attorney, Agent, or Firm*—Roberts, Spiecens & Cohen

[57] ABSTRACT

To eliminate armature or rotor reaction or leakage flux (leakage reactance) in an electric rotating machine, a short-circuit coil winding is wound on and through the rotor or an armature core of the machine. The short-circuit coil winding is wound at a right angle to the main coil to exclude any intervention. Due to placement of a non-magnetic material in the armature core, the leakage flux which flows in the non-magnetic material is reduced and the flux of the stator and the rotor flows separately along both sides to the inner part of the armature or rotor ring core. Due to the non-magnetic material, the flux which occurs due to the current of the transformer m.m.f. of this short-circuit ring coil extends substantially into the airgap, therefore to abate the effect of armature reaction flux in the airgap.

7 Claims, 26 Drawing Figures

4,716,329

ARMATURE CONSTRUCTION FOR ELIMINATING ARMATURE REACTION IN ELECTRIC ROTATING MACHINES

CROSS-RELATED APPLICATION

This Application is a continuation of Application Ser. No. 874,664, filed Feb. 2, 1979, continuation-in-part of copending Application Ser. No. 321,544 filed Jan. 5, 1973.

FIELD OF THE INVENTION

This invention relates to an armature or rotor structure for an electrical rotating machine (motor or generator) which prevents certain undesirable effects which are inherent in the armatures or rotors of conventional electrical machines.

BACKGROUND

In conventional electrical machines, when the armatures or rotors are subjected to load, certain undesirable effects occur. More specifically, when current flows through the armature or rotor conductors, there is produced armature or rotor reaction flux in the air gap which changes both the magnitude and distribution of the flux crossing the air gap and adds vectorially to the main magnetic field, producing a resultant magnetic field which lies in a different direction from the main magnetic field, causing phase and wave form distortions in the main magnetic field flux.

Another undesirable effect in conventional electrical machines is the production of high frequency flux in the air gap, causing losses, heating and dielectric breakdown.

In studying these problems of the conventional electrical machines, I have found that the armature or rotor reaction flux and the high frequency flux of the air gap can be greatly reduced by the installation of a short-circuit ring winding and by providing a non-magnetic material on the armature or rotor all without necessitating substantial changes in existing equipment and in normal techniques of winding and installation of such winding.

SUMMARY OF THE INVENTION

It is a primary object of the present invention to provide an electrical rotating machine (motor or generator) and particularly an armature or rotor therein which overcomes the undesirable features and deficiencies associated with conventional machines as given above.

It is another object of the present invention to provide an improved armature or rotor which obviates operational problems arising from the fact that the armature reaction flux increases as the load current of the armature conductors increases, thereby to attain significant improvement in the efficiency and output over the conventional electrical rotating machines.

In accordance with the invention, I provide an improved armature or rotor for use in electrical rotating machines in which non-magnetic material is introduced between the armature or rotor core and the shaft to reduce leakage flux and a short circuit ring coil is installed on the armature or rotor core between the main coil and the non-magnetic material at right angles to the main coil.

When the armature conductors carry current, there is produced in the air gap, armature reaction flux, namely, (a) shift of the magnetic neutral plane in a D-C machine and armature reactance in a synchronous machine or (b) leakage reactance due to load current of the rotor conductors in an induction motor in the air gap. This armature reaction flux is neutralized and cancelled by the substantially equal and opposite value of the flux of the transformer m.m.f. of the short circuit ring coil, so that the resultant field flux crossing the air gap is nearly uniformly distributed, that is, the phase and wave form distortions of the resultant field flux are greatly reduced to approach the wave form of no load main field flux. Therefore, the output of the electric rotating machine is substantially increased.

The high frequency flux produced in the air gap is also greatly reduced by the flux of the transformer m.m.f. of the high frequency in the short circuit ring coil because they are out of phase with each other by 180°. Thus, losses, magnetic noise, heating and dielectric breakdown are substantially diminished. The efficiency is accordingly increased.

BRIEF DESCRIPTION OF THE DRAWING

In the drawing:

FIG. 1' is an axial cross-section of the apparatus of FIG. 1 (and also of FIG. 3 listed below);

FIG. 1" is a fragmentary section illustrating flux change and the use of a non-magnetic material in accordance with the invention;

FIG. 2' is a fragmentary section illustrating flux change;

FIG. 3' is a chart illustrating flux change;

FIG. 4' is a chart illustrating flux change;

FIG. 5' shows rotor reaction and phase or wave-form distortion for an induction motor in accordance with the invention;

FIG. 7' is an axial cross-section of the apparatus of FIG. 7;

FIG. 8' is an axial cross-section of the apparatus of FIG. 8;

FIG. 9' is an axial cross-section of the apparatus of FIG. 9;

DETAILED DESCRIPTION

Figure 1:
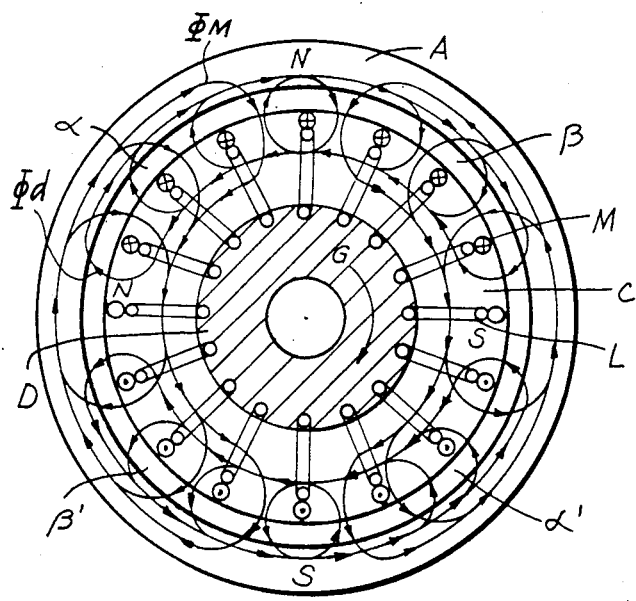
FIG. 1 shows an armature drum winding for a drum-type generator and a magnetic circuit in accordance with the invention.

In FIG. 1 which shows the magnetic path of an armature and one of the stator magnetic poles in a generator, element A is a static field magnetic pole and element C is a drum type armature. M is the main coil (drum winding) and L is a short circuit winding (ring or loop winding). If a non-magnetic material D, which is not a ferromagnetic material, is inserted into the central part of the armature (that is, inside of the iron core), then the flux changer of the inner part of the armature core between the flux ($\phi M$) of the stator field and the flux ($\phi d$) of the reaction of the armature becomes counter to the flux change of the airgap with a flux having a 90° phase lag for the reason described below.

Namely, the flux in the $\alpha$ airgap part of the N pole becomes $\phi M - \phi d$, and the flux in the $\beta$ airgap part of the N pole becomes $\phi M + \phi d$. Thus, the airgap of the whole N pole is the increased flux change $\phi M + \phi d - (\phi M - \phi d) - 2\phi d$ in the direction of the rotation. Also, the increased flux change $2\phi d$ in the direction of rotation occurs in the whole S pole.

The flux change of the inner part of the armature core is as follows. Namely, the flux in the inner part of the armature core of the $\alpha$ part in the N pole is $\phi M\theta + \phi d\theta$, and the flux in the inner part of the armature core of the $\beta$ part is $\phi M\theta - \phi d\theta$. Thus, the inner part of the armature core in the whole N pole is the decreased flux change $\phi M\theta - \phi d\theta - (\phi M\theta + \phi d\theta) = -2\phi d\theta$ in the direction of rotation. Also, the inner part of the armature core in the entire S pole undergoes a decrease in flux change $-2\phi d\theta$ with a 90° phase lag.

The triangular reaction or the phase distortion of the airgap is counter to the phase distortion and the waveform of the inner part of the armature core. The flux of the transformer mmf prevents phase distortion of the flux of the airgap due to the flux change of the inner part of the armature core in the short-circuit ring coil (L). The distortion disappears in the unbalanced flux distribution of the airgap, for there is no distortion in the main field flux $\phi M$.

In FIG. 1', which shows a cross section of the apparatus of FIG. 1, A is the static field magnetic pole, C is the armature, and non-magnetic material D, which is not a ferromagnetic material, is inserted into the central part of the armature. The magnetic flux is shunted in a direction around both circles of the inner part of the armature as shown in FIG. 1 and FIG. 2b. Therefore, a change of a magnetic flux at the inner part of the armature occurs.

As indicated by the arrows in FIG. 1', the magnetic flux, which is induced in the ring coil (L) by the flux change of the inner part of the armature, is not passed in the direction of the shaft, but is substantially passed in the direction of the airgap and stator A, whereby the effect of the action of the ring coil (L) is increased.

FIG. 1" shows the flux change at an N pole of a generator.

When the armature conductor (main coil M) carries current, there are produced the increased flux change of $+2\Phi d$ in the air gap and and the decreased flux change of $-2\Phi d\theta$ in the inner part of the armature core C in the direction of rotation.

The decreased flux ($-2\phi'd$) of the transformer m.m.f. in the direction of rotation which is induced in the short circuit ring L by the decreased flux change ($-2\phi d\theta$) of the inner part of the armature core C, passes in the air gap in opposition to the flux change ($+2\phi d$) of the air gap.

Therefore, the flux change (the armature reaction flux) of the air gap is greatly reduced by the substantially equal and opposite value of the flux of the transformer m.m.f. of the short circuit ring coil since they are at a 180° phase different with each other.

A far greater amount of the flux of the transformer m.m.f. induced in the short circuit ring coil is distributed to and travels through the air gap than through the shaft since the non-magnetic material is interposed between the armature core and the shaft.

The phase and wave form distortions of the resultant field flux of the air gap is greatly diminished to approach the main field flux as will be described in detail in FIG. 5.

Figure 2:
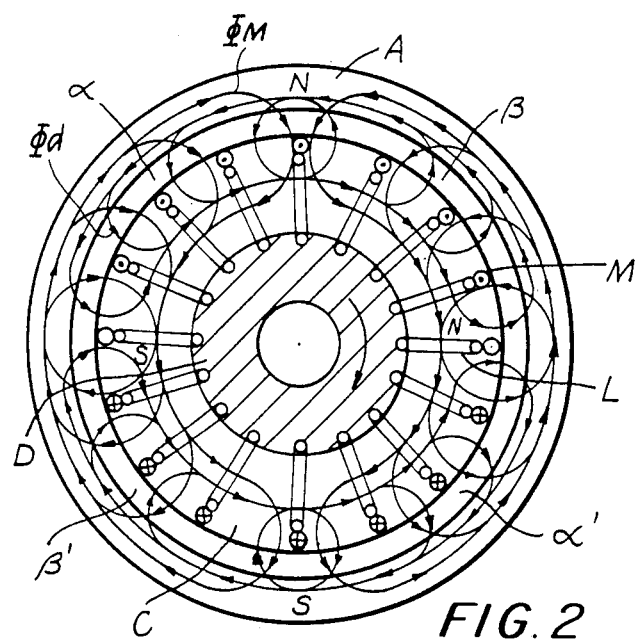
FIG. 2 shows an armature drum winding for a drum-type motor and a magnetic circuit in accordance with the invention.
Figure 2B:
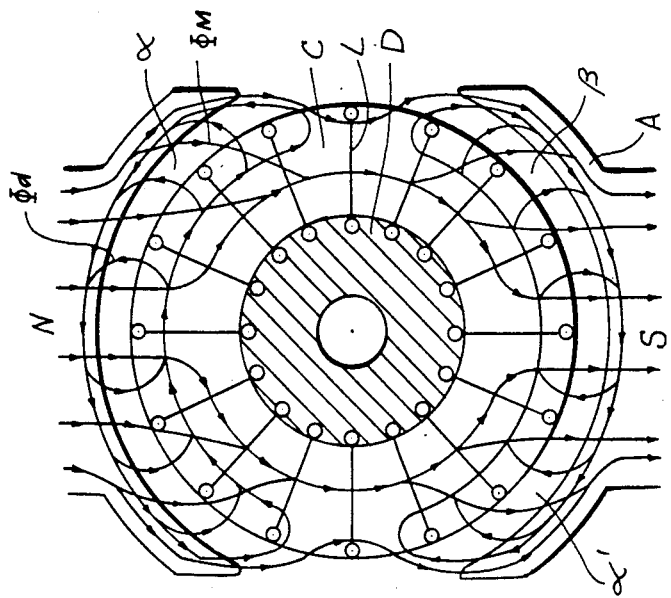
FIGS. 2a and 2b are radial cross-sections comparing electric machines without and with the use of non-magnetic material.

FIG. 2 shows the magnetic path of the stator and the flux change of the magnetic path of the inner part of the rotor in a motor. A is the stator, C is the rotor, L is the short-circuit ring coil, and D distributes the flux in the direction of the airgap. Therefore, the leakage flux decreases in the inner part of the rotor, and reaction is prevented in the airgap. This flux distribution in the generator of FIG. 1 and the motor of FIG. 2 is induced as follows:

| (1) Flux change in the airgap | | | |
|---|---|---|---|
| Classification | | | |
| Assortment | $\alpha, \alpha'$ airgap part | $\beta, \beta'$ airgap part | The flux change to the direction of the $\beta$-$\alpha$, $\beta'$-$\alpha'$ |
| Generator | $\phi M - \phi d$ | $\phi M + \phi d$ | $\phi M + \phi d - (\phi M - \phi d) = +2\phi d$ |
| Motor | $\phi M + \phi d$ | $\phi M - \phi d$ | $\phi M - \phi d - (\phi M + \phi d) = -2\phi d$ |

| (2) Flux change in the inner part of the armature core | | | |
|---|---|---|---|
| Classification | | | |
| Assortment | $\alpha, \alpha'$ inner part of the core | $\beta, \beta'$ inner part of the core | The flux change to the direction of the $\beta - \alpha$, $\beta' - \alpha'$ |
| Generator | $\phi M\theta + \phi d\theta$ | $\phi M\theta - \phi d\theta$ | $\phi M\theta - \phi d\theta - (\phi M\theta + \phi d\theta) =$ |

| | | | -continued |
|---|---|---|---|
| Motor | $\phi M\theta - \phi d\theta$ | $\phi M\theta + \phi d\theta$ | $\phi M\theta + \phi d\theta - (\phi M\theta - \phi d\theta) = +2\phi d\theta$ |

As evident from the above, the flux change of the generator is opposite the flux change of the motor. Also, the flux change in the air gap is opposite the flux change in the armature core both for the generator and motor.

Figure 2A:
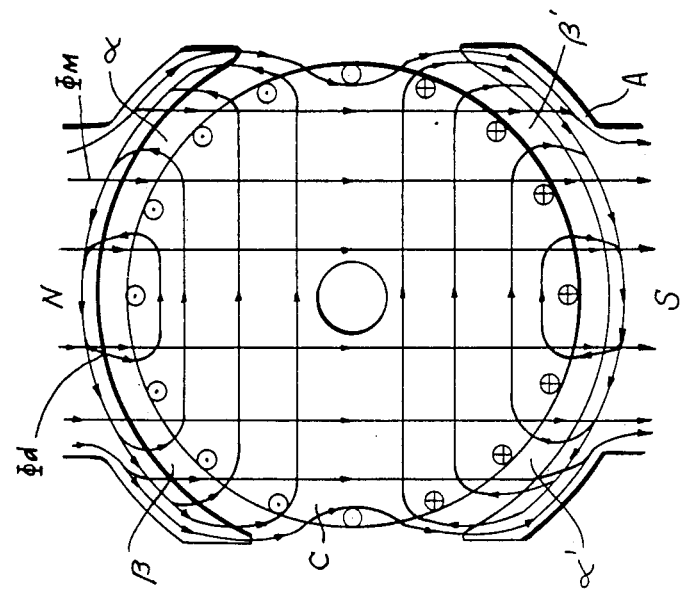
Figure 1:
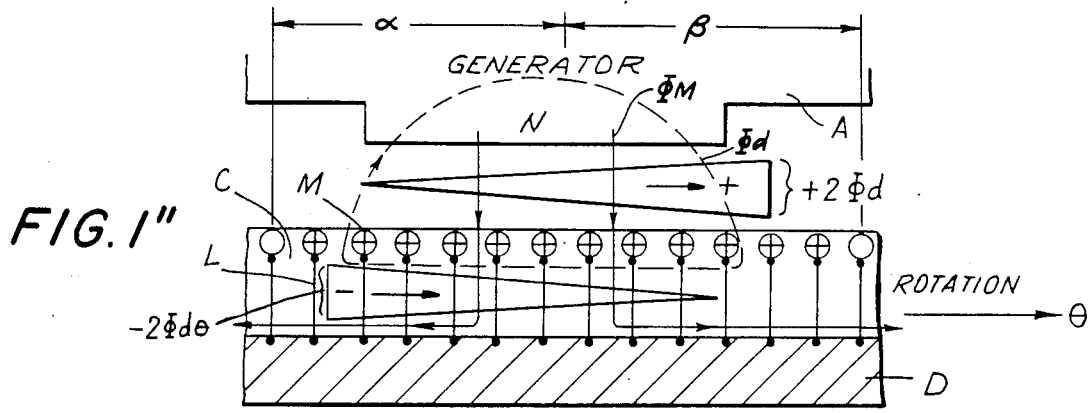
Figure 3:
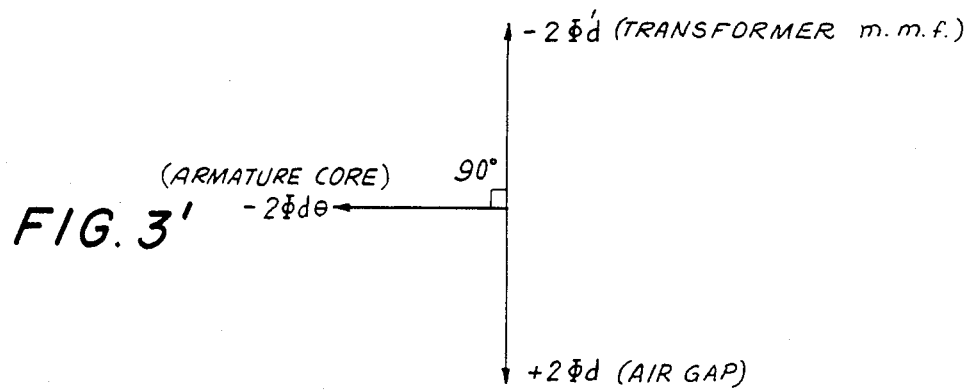
Figure 2:
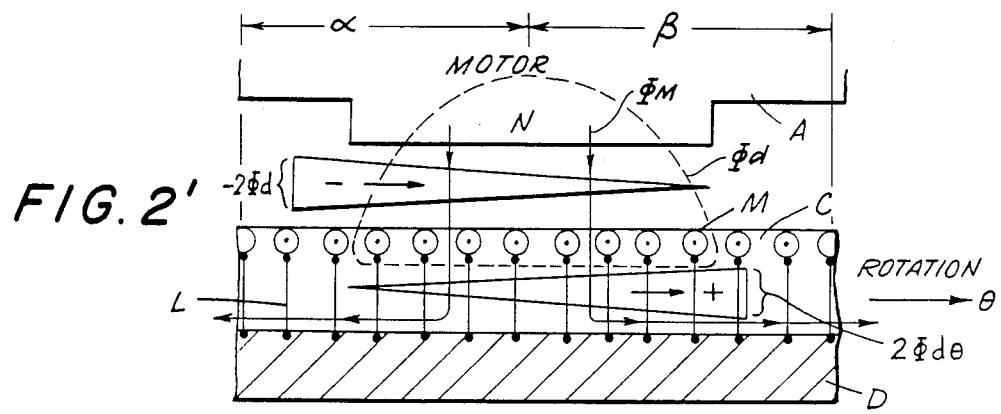
Figure 4:
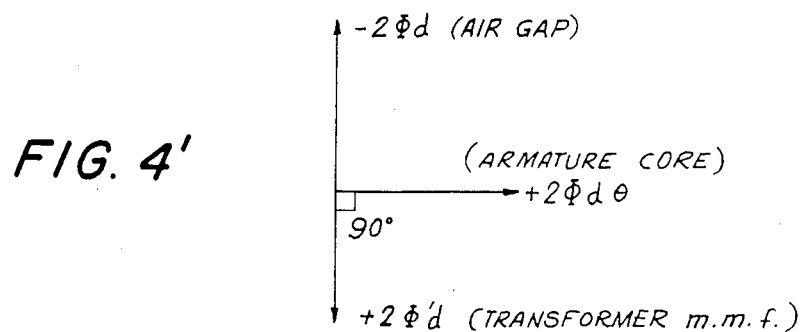

FIG. 2a shows an arrangement in which the non-magnetic material has not been placed around a shaft and FIG. 2b compares the case in which the non-magnetic material has been employed. In FIG. 2a, the flux, which passes through into the inner part of the armature core, has no distribution in the directions around the sides thereof, but FIG. 2b shows such distribution. When the non-magnetic material is used, the flux change of $\phi M\theta - \phi d\theta - (\phi M\theta + \phi d\theta) = -2\phi d\theta$ occurs in the inner part of the armature core of the generator and the flux change $\phi M\theta + \phi d\theta - (\phi M\theta - \phi d\theta) = 2\phi d\theta$ occurs in the inner part of the armature core of the motor in the direction of rotation.

Use is made of the gaps of the non-magnetic material to be able to wind therein the short-circuit ring coil. As described relative to FIG. 1', by placement of the non-magnetic material to pass the flux resulting from the transformer m.m.f. which occurs in the short-circuit ring coil, substantially more in the direction of the airgap than the shaft, there can be obtained a decrease in the armature reaction. In small horsepower machines, a non-magnetic material such as aluminum, PVC, etc. which is structurally weak can be used. In high horsepower machines, non-magnetic materials such as nickel-steel, stainless steel, copper, etc. which are structurally strong can be used.

The flux change of the reaction in the airgap is counter to the flux change of the reaction in the inner part of the armature, and the generator is also counter to the motor.

FIG. 2' shows the flux change at an N pole of a motor by the installation of the non-magnetic material and a short circuit ring coil.

When the armature conductor (main coil M) carries current, there are produced the decreased flux change of $-2\phi d$ in the air gap and the increased flux change of $+2\phi d\theta$ in the inner part of the armature core C in the direction of rotation.

The increased flux $(+2\phi'd)$ of the transformer m.m.f. in the direction of rotation which is induced in the short circuit ring coil L, passes through the air gap to oppose the flux change $(-2\phi d)$ in the air gap.

Therefore, the flux change (the armature reaction flux) in the air gap is greatly diminished by the flux of the transformer m.m.f. of the short circuit ring coil because they are at a 180° phase difference with each other.

A considerable amount of the flux of the transformer m.m.f. of the short circuit ring coil passes through the air gap without going through the shaft due to the interposition of the non-magnetic material between the armature core and the shaft.

The phase and wave form distortions of the resultant field flux of the air gap are substantially reduced because of the great reduction of the armature reaction flux in the air gap regardless of the condition of load current as will be described in detail in FIGS. 5' and 6.

Figure 3:
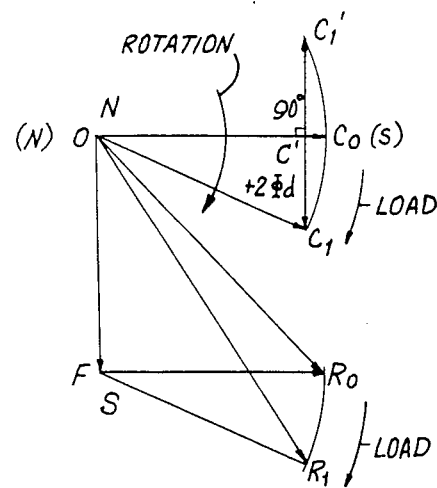
FIG. 3 is a magnetizing vector diagram and short-circuit winding m.m.f. for a generator in accordance with the invention.

FIG. 3 shows the generator resultant magnetizing vector diagram and illustrates in greater detail the effect of the operation in the case of constructing the generator as shown in FIG. 1.

OF in FIG. 3 is in the direction of the main field $(\phi M)$. The armature mmf $(\phi A)$ of $OC_o$ becomes the phase distortion in the direction of rotation with $OC_1$ due to magnetization flux of the armature reaction $(+2\phi d)$ of $C'C_1$. This becomes the generator resultant magnetizing component $OR_1$ which is a combination of OF and $OC_1$.

Therefore, the output $(OR_1)$ of the prime mover has to be increased and the output $(OC')$ of the generator is, on the contrary, decreased. If there is the mmf $C'C_1'$ $(-2\phi'd)$ that is counter to reaction mmf $C'C_1$ $(+2\phi d)$ which is to change the main field, the armature reaction disappears.

$C'C_1'$ is the demagnetization change $(-2\phi'd)$ of the reaction flux (in the direction of rotation) in the inner part of the armature core and decreases the reaction flux in the airgap by the transformer m.m.f. which is induced in each short-circuit ring coil. This flux has a 90° phase lag more than $OC_0$. Thus, the direction of $C'C_1'$ is counter to the reaction flux $(C'C_1)$. Therefore, the generator resultant magnetizing component, which does not have armature reaction, becomes $OR_0$. The output of the generator is increased OCO from OC' even though the output of the prime mover is to $OR_0$ from $OR_1$. By this method, needless to say, in the D.C. or the A.C. generator, the output is increased on account of improving the distortion in the brushless generator.

As shown in FIG. 3', the flux change $+2\phi d$ in the airgap of the generator becomes the 90° lagging flux change $-2\phi d\theta$ in the inner part of the armature core. Due to this flux change, the armature flux of the transformer m.m.f $(-2\phi'd)$ in the short-circuit ring coil occurs, so the reaction $+2\phi d$ which has the 180° phase difference with the flux of the transformer mmf $(-2\phi'd)$ is prevented.

Figure 4:
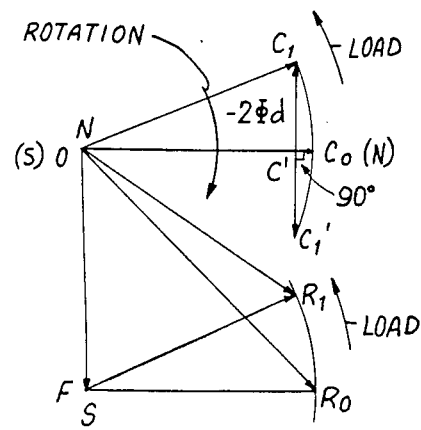
FIG. 4 is a demagnetizing vector diagram and short-circuit winding m.m.f. for a motor in accordance with the invention.

FIG. 4 shows the resultant motor demagnetizing vector diagram in case of a motor which is constructed as in FIG. 2. OF is in the direction of the main field $(\phi M)$ and the armature mmf of $OC_0$ $(\phi A)$ has the phase distortion of $OC_1$ in the counter-direction of rotation due to the reaction component of $C'C_1(-2\phi d)$. Therefore, the torque of the resultant motor demagnetizing component $OR_1$ is decreased. If there is mmf $C'C_1'(2\phi'd)$ which is counter to the reaction component $C'C_1(-2\phi d)$ which changes the main field of the airgap, the phase distortion does not occur due to the disappeared reaction.

$C'C_1'$ as in the case of the generator is the transformer m.m.f. (this is at a 90° lag more than $C_0O$) which is induced in each short-circuit ring coil by a change of the reaction flux in the inner part of the armature core. Thus, the torque is increased, for it becomes the resultant component $OR_o$ of the motor which has no armature reaction. The flux of the transformer m.m.f., which is induced in each short-circuit ring coil due to the change of the flux distortion in the inner part of the armature core, abates the distortion flux of the airgap. Therefore the armature reaction of the airgap disappears in counter direction to the reaction flux of the transformer m.m.f., thus improving all of the special characteristics. The effect obtained in the linear motor can be, needless to say, in a D.C. or A.C. motor, by this method.

As shown in FIG. 4', the flux change $-2\phi d$ in the airgap of the motor becomes the flux change $2\phi d\theta$ with the 90° lag in the inner part of core. Due to this flux change, the flux of the transformer m.m.f. $(+2\phi'd)$ occurs in the short-circuit ring coil. As a result of this, the armture reaction which has a 180° phase difference with the flux of the transformer m.m.f. is diminished. Specifically, if there were any flux changes in the airgap, the flux changes contrary to these also occur in the inner part of the armature core, and so the flux of the transformer m.m.f. occurs in the inner part of the armature core. As a result of this, flux change in the airgap is prevented. Therefore, if a high frequency $(\phi H)$ were to occur according to the figure of a slot, the form of a core, and change of load in the airgap, this becomes the flux change $(\phi HO)$ of the high frequency in the inner part of the core. As a result of this, the high frequency $(\phi H)$ of the airgap which has a 180° phase difference relaive to the flux of the transformer m.m.f $(\phi'H)$ of this high frequency is greatly diminished. Therefore, the high-frequency loss vanishes and the temperature is decreased.

As the leakage flux disappears, the effective flux is increased. The output is increased due to improving of the phase distortion, so a high efficiency can be obtained. Although the load is increased 150% in rotating machines, the design is appropriate for use.

Figure 5:
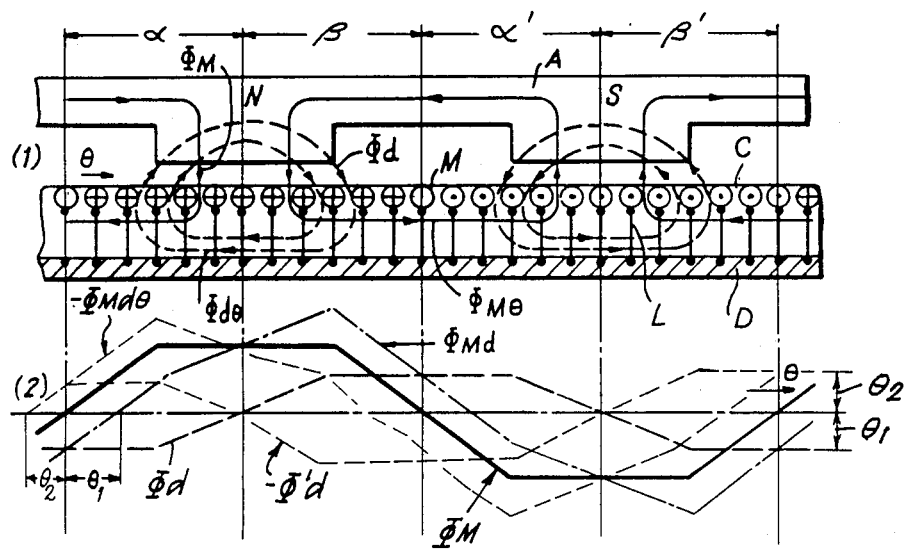
FIG. 5 shows reaction and phase or wave-form distortion for a D.C. machine in accordance with the invention.
Figure 5:
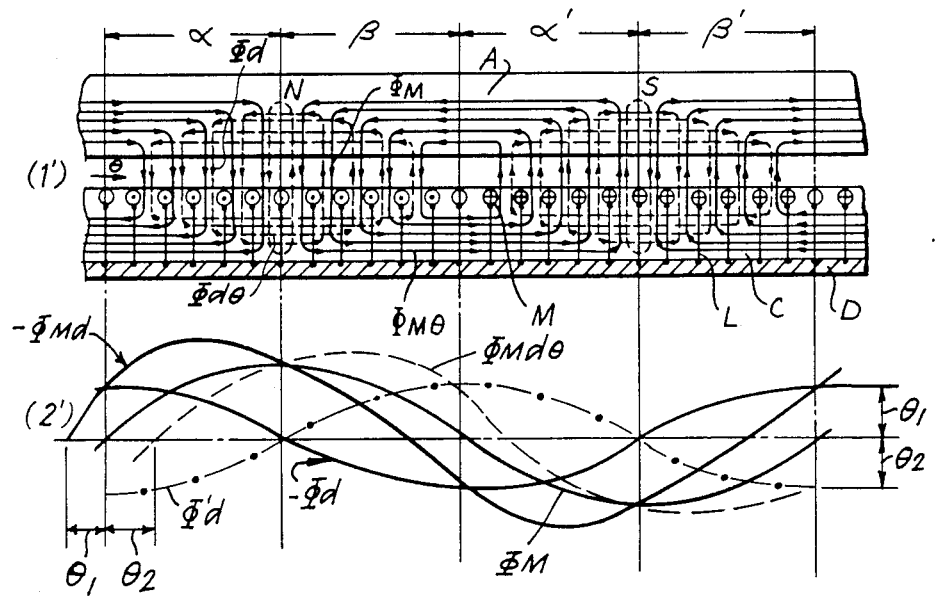

FIGS. 5 (1) and 5'(1') illustrate the magnetic circuit of the generator and induction motor respectively.

M is the main coil (drum winding), L is the short circuit coil (ring winding) of the armature or rotor core (C) and D is the non-magnetic material installed in the interior of the armature or rotor core. When the rotating electric machine is operated at no load, the speed e.m.f. (Ev) is generated in the conductors of the short circuit ring coil (L) at the air gap side by the main field flux and the transformer e.m.f. (Et) is generated in the conductors of the short circuit ring coil at the inner side of the armature core by the flux change of the armature core through the transformer action in FIG. 5 (1).

Therefore, the speed e.m.f. (Ev) is neutralized and cancelled by the equal and opposite value of the transformer e.m.f. (Et) in the short circuit ring coil because they are at 180° phase difference with each other, so that no current flows in the short circuit ring coil at no load.

When the armature conductor (main coil, M) carries current, there is produced the flux change in the armature core which induces the transformer e.m.f. (Et) in the short circuit ring coil by the transformer action, so that the transformer current flows in the short circuit ring coil at load.

FIGS. 5 (2) and 5' (2') illustrate the distribution of the flux density of the generator and induction motor respectively.

Curve $\phi M$ represents the distribution of the main flux density in the air gap produced by the main field m.m.f. acting along (at no load).

Curve $\phi d$ represents the armature or rotor reaction flux in the air gap produced by the armature or rotor m.m.f. acting alone.

Curve $\phi Md$ represents the distribution of the resultant flux density in the air gap produced by the main field m.m.f. and armature or rotor m.m.f. acting together, which has a phase distortion at an angle of $\theta_1$ from the main field flux $(\phi M)$.

Curve $\phi Md\theta$ represents the distribution of the resultant flux density in the inner part of the armature or rotor core produced by the main field m.m.f. and armature or rotor m.m.f. acting together, which has a phase distortion of angle $\theta_2$ from the main field flux $(\phi M)$.

Curve $\phi'd$ represents the distribution of the flux density of the transformer m.m.f. in the short circuit ring coil produced by the flux change $(\phi Md\theta)$ of the inner part of the armature or rotor core.

When the main coil carries current, there are produced the armature or rotor reaction flux $(\phi d)$ in the air gap and the flux change $(\phi Md\theta)$ in the inner part of the armature or rotor core. The flux change $(\phi Md\theta)$ of the inner part of the armature or rotor core induces the flux $(\phi'd)$ of the transformer m.m.f. in the short circuit ring coil by the transformer action.

Therefore, the armature or rotor reaction flux $(\phi d)$ of the air gap is neutralized and cancelled by the substantially equal and opposite value of the flux $(\phi'd)$ of the transformer m.m.f. of the short circuit ring coil because they are in 180° phase difference with each other, so that the resultant field flux distribution substantially coincides with the main field flux $(\phi M)$ in the air gap in D-C and A-C generators and motors of the invention.

Thus, the phase distortion (the $\theta_1$ angle is neutralized by the $\theta_2$ angle) and wave form distortion of the resultant field flux $(\phi Md)$ are greatly reduced.

Figure 6:
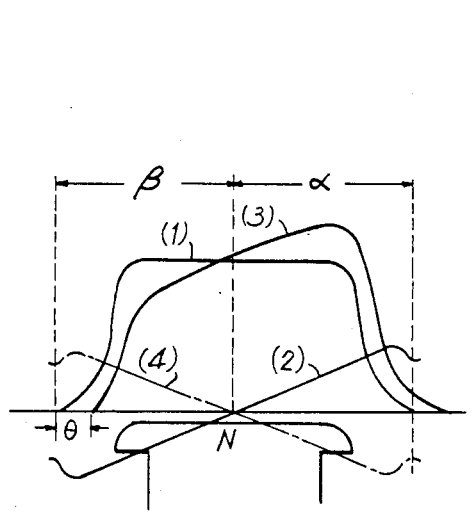
FIG. 6 illustrates armature reaction due to phase distortion and wave-form distortion for a D.C. machine and short-circuit ring winding flux in accordance with the invention.

FIG. 6 illustrates the distribution of the flux density of an N pole of a D-C motor.

Curve (1) is the main field flux and Curve (2) is the armature reaction flux.

Curve (3) is the resultant field flux of the main field flux and armature reaction flux in the air gap, which has phase distortion of the angle $\theta$ from the main field flux.

Curve (4) is the flux of the transformer m.m.f. of the short circuit ring coil.

The armature reaction flux (Curve 2) is greatly reduced by the substantially equal and opposite value of the flux (Curve 4) of the transformer m.m.f. of the short circuit ring coil, so that the resultant field flux (Curve 3) nearly coincides with the main field flux (Curve 1) in the air gap.

Therefore, the magnetic neutral (at load) nearly coincides with the mechanical neutral (at no load) since the phase distortion of the resultant field flux of the air gap is greatly reduced. The voltage induced in the commutator segments is nearly uniform since the waveform distortion of the resultant field flux of the air gap is greatly reduced. Thus, commutation performance is improved.

Figure 7:
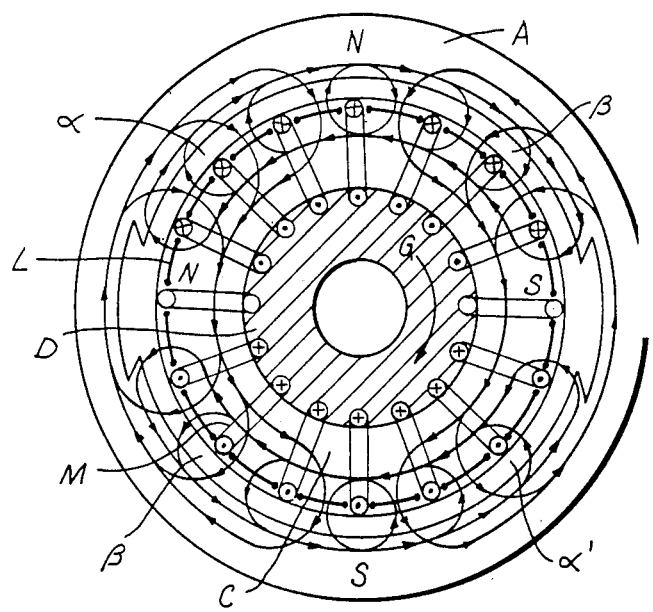
FIG. 7 shows an armature ring winding for a drum-type machine and a magnetic circuit in accordance with the invention.

FIG. 7 shows the main coil of the armature as a ring winding which is contrary to FIG. 1 and FIG. 2.

FIG. 7' shows a cross-section of FIG. 7.

The ring winding becomes the main coil (M) of the armature and the drum winding becomes the short circuit coil (L) which is wound on the slots of the outer part of the armature core. The main ring coil (M) is at right angles to the short circuit drum coil (L) which is not to be interfered with. If the non-magnetic material (D) is kept in the inside of the armature core, the flux which occurs in the main coil is substantially passed in the air gap. There is a flux change due to the armature reaction flux of the air gap in this rotating machine which is constructed to reduce the leakage flux in the direction of the shaft.

When the main coil (ring winding) carries current, there are produced armature reaction flux in the air gap and flux change in the inner part of the armature core which are 90° phase different from each other. The flux change of the armature core induces the flux of the transformer m.m.f. in the short circuit drum coil which has the 90° phase difference. Therefore, the armature reaction flux in the air gap is greatly reduced by the flux of the transformer m.m.f. of the short circuit drum coil because they are 180° phase different from each other.

Therefore, high efficiency and output can be obtained.

Figure 8:
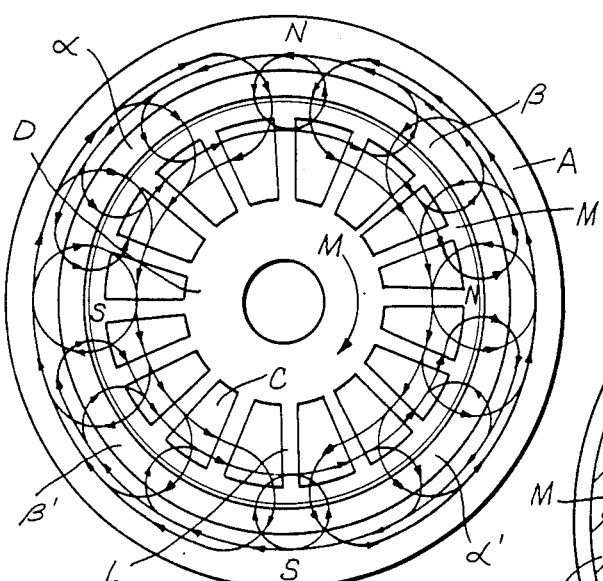
FIG. 8 shows a winding and magnetic circuit for a rotor in a drum-type induction motor in accordance with the invention.

FIG. 8 shows a drum type of the squirrel cage induction motor and FIG. 8' is a cross-section of FIG. 8.

When the rotating magnetic field of the stator (A) rotates, the rotor (C) rotates by induction. The main coil (drum winding) is wound in each slot of the outer part of the rotor (C) and the short circuit ring coil (L) is wound on each side and the inner part of the rotor core, which are made of the same non-magnetic conductor such as copper in the wound type of the induction motor. The non-magnetic material (D) is installed between the rotor core and the shaft.

The main drum coil, the short circuit ring coil and the non-magnetic material are made as an aluminum die casting in the squirrel cage induction motor as shown in FIGS. 8 and 8'.

The rotor reaction flux is greatly reduced by the flux of the transformer m.m.f. of the short circuit ring coil because they are 180° phase different from each other as described in respect of FIG. 5' (2'). The phase and wave form distortions of the resultant field flux are greatly reduced, the leakage reactance is significantly diminished, and the effective flux of the fundamental waveform is increased and the load current is decreased. Namely, the reactance $(X_1 + X'_2)$ is small and the diameter $V_1/(X_1 + X'_2)$ is enlarged in the circle diagram of the induction motor. Thus, the output is substantially increased.

The high frequency flux of the air gap is also greatly reduced by the flux of the transformer m.m.f. of the high frequency of the short circuit ring coil because they are 180° phase different from each other, so that the loss, temperature, dielectric breakdown and slot angle for skewing are significantly reduced.

Figure 9:
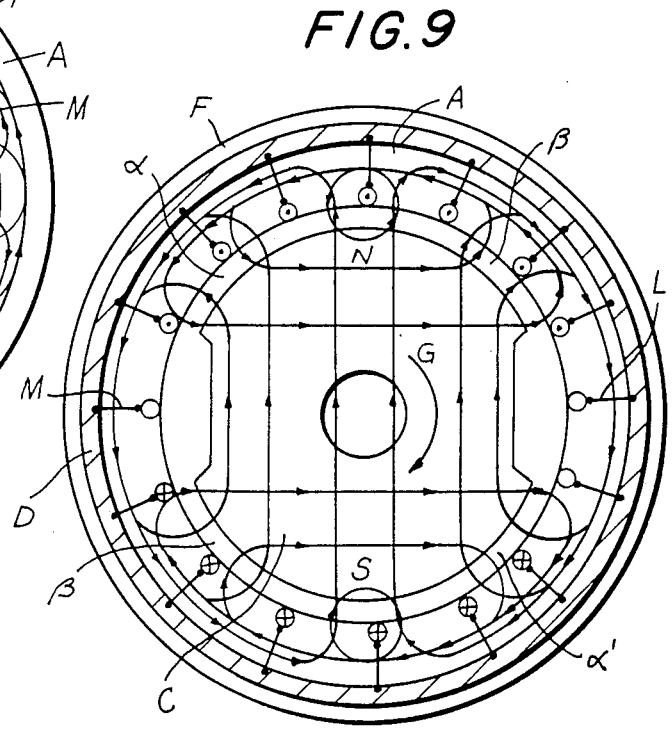
FIG. 9 shows an armature winding and magnetic circuit for a rotating field synchronous machine in accordance with the invention.
Figure 1:
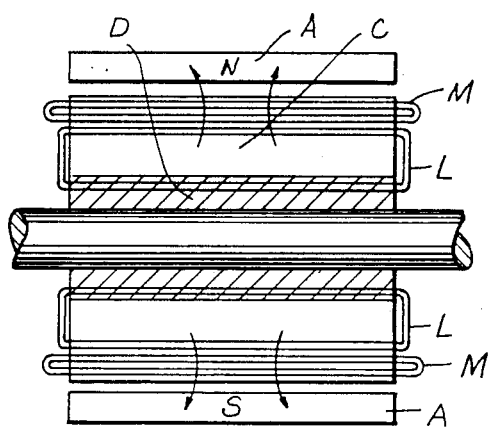
Figure 7:
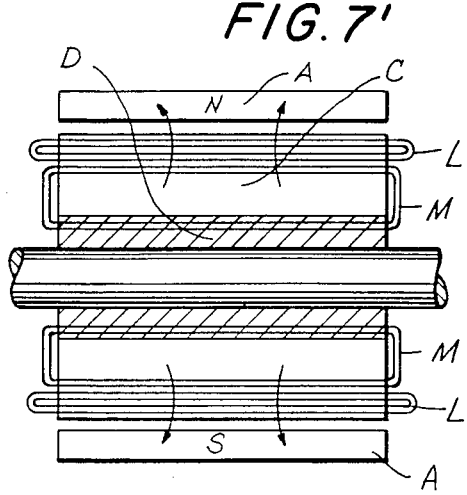
Figure 8:
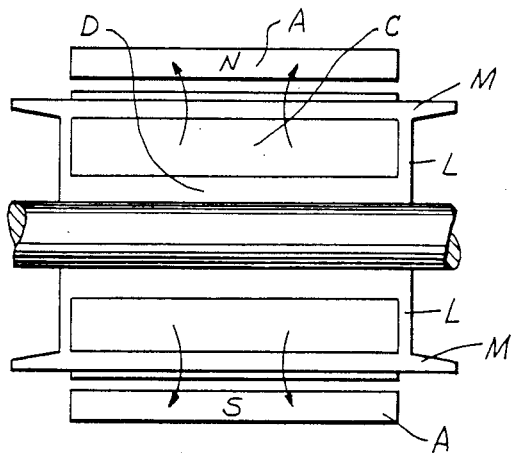
Figure 9:
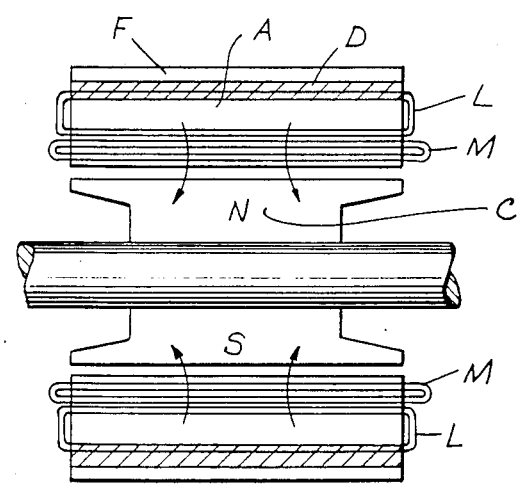

FIG. 9 shows the magnetic circuit of a rotating field synchronous generator and FIG. 9' is a cross-section of FIG. 9.

The main coil (drum winding M) and short circuit coil (ring winding L) are wound on the inner part and outer part of the armature core A respectively. The non-magnetic material D is installed between the frame F and armature core A to reduce the leakage flux. The armature reaction flux in the air gap B is greatly reduced by the flux of the transformer m.m.f. of the short circuit ring coil L because they are 180° phase different from each other, so that the phase and wave form distortions of the resultant field flux of the air gap are substantially reduced.

P (the output) increases due to the decrease of Xs (the leakage reactance) and the increase of E (the excitation voltage) according to the following equation, $P = (EV/Xs) \sin \delta$, wherein $\delta$, is the power angle and V is the terminal voltage. The efficiency is also increased and the voltage regulation is decreased.

Figure 10:
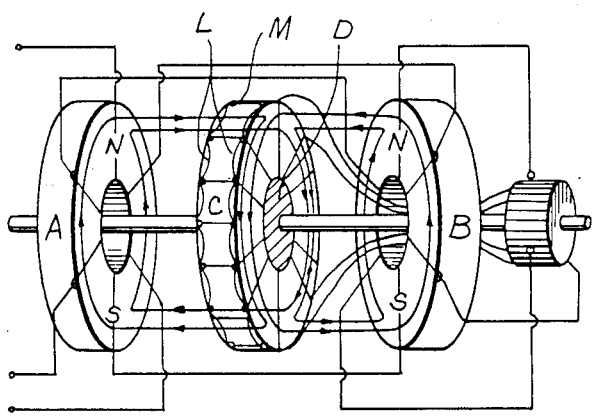
FIG. 10 shows the construction of two stators and a rotor in a circular-plate-type machine in accordance with the invention.

In FIG. 10 is shown a circular-plate type three-phase commutator series motor. Elements A and B are static magnet poles or magnetic stators. Element C is a rotor between poles A and B. The arrangement is a circular plate type commutator motor or synchronous motor when elements A and B are set up to be a field pole and rotor C is set up to be an armature. When a rotating magnetic field is supplied by poles A and B, the arrangement is a circular plate induction motor which rotates rotor C inductively. When current is applied in the same phase to the stators of the above-mentioned circular plate machine, a magnetic path passes straight through the inside of the rotor and a motor which is rotated by rotating field can be composed. When a current is applied, which has a 180° phase difference relative to the stator, a different pole of the stator is oppositely directed and then the magnetic path traverses the rotor. Thus a motor can be constructed which is rotated by rotating the magnetic path in different poles. When the two stators are constructed with a different number of poles, any rotating speed can be obtained between the two synchronous speeds by adjusting the voltages applied to the stators.

Several variations of this circular-plate type machine can be achieved to get various machine characteristics. When D.C. is applied to the stators, the machine constitutes two D.C. motors. When A.C. is applied, it becomes an A.C. motor. When A.C. and D.C. are applied to each stator, respectively, the machine has both A.C. and D.C. machine characteristics. One of the two stators can be controlled and speed controlling can be made possible by proportional shifting, voltage control, and dynamic braking without a voltage regulator or speed regulator. Also, this control method can be used to adjust voltage wave form in generators and to eliminate the Gorge phenomena in motors. The armature or central part of the rotor drawn with hatched lines as shown in FIG. 10 is made of non-magnetic material or non-magnetic metal D. This structure has minimized flux leakage. As described in FIG. 7, the flux, of the transformer m.m.f. induced in the short circuit drum winding (L) cancels the armature reaction in the air gap.

Figure 11:
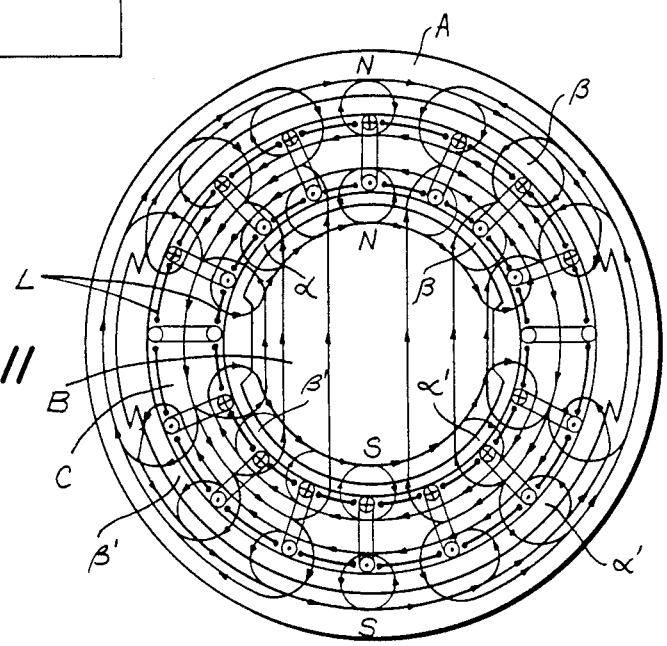
FIG. 11 shows an armature winding and magnetic circuit for a circular-plate-type machine in accordance with the invention.

FIG. 11 shows a cylindrical type of machine which is similar to the above-described circular-plate type machine. The stators A and B in FIG. 10 are cylindrical in shape and one is inside the other. There is a cylinder between the two cylindrical stators A and B. The main magnetic field is demagnetized due to the armature current in the $\alpha$ airgap parts of the N poles and in the $\alpha'$ airgap parts of the S poles, while in the $\beta$ airgap parts of the N poles and in the $\beta'$ airgap parts of the S poles, there is magnetization. This configuration of magnetic fields results in the same effect as that in the first embodiment in FIG. 1 and FIG. 2. The induced voltage on the armature is determined only by the main field magnetic flux and is not influenced by armature reaction. A short circuit drum winding (L) is wound at a right angle to the main winding (M) which is wound as a ring type.

By these means, commutation can be improved effectively in both A.C. and D.C. machines. As described in relation to FIG. 7 or FIG. 10, this shows the construction method to distribute the flux change which is at a 90° lag from the flux of the armature reaction in the airgap. Also, the flux change is passed to the inner part of the armature ring core in the cylindrical type machine. The short-circuit drum winding or short-circuit ring winding is kept in both sides of the armature to prevent both reactions.

Figure 12:
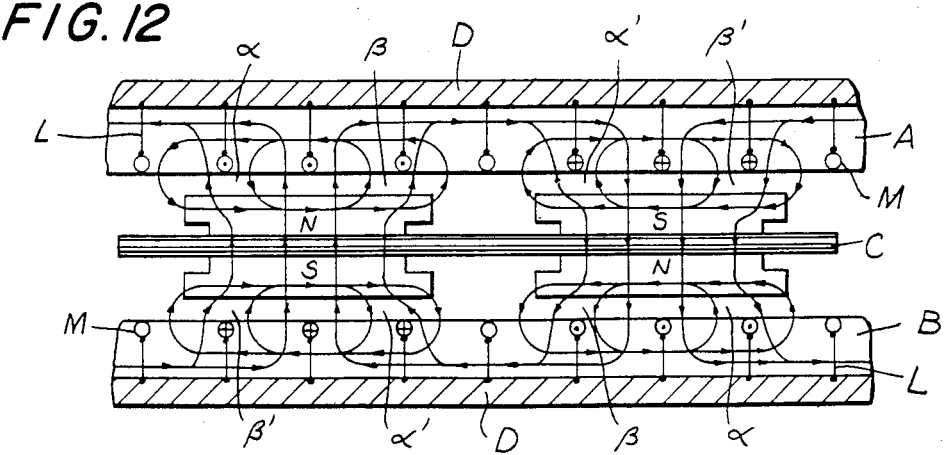
FIG. 12 shows an armature winding and magnetic circut for a circular-plate-type synchronous machine in accordance with the invention.

In FIG. 12, a circular-plate type synchronous generator is shown. Elements A and B are a stationary armature. Element C is a rotating field pole. The stationary armature core is wound with a main drum winding and a short circuit winding as a ring winding. The armature core is covered with non-magnetic materials (D) in order to prevent leakage flux, as a result of which induced voltage throughout the armature main winding is not influenced by armature reaction. An excellent generator is obtained with good efficiency and small voltage regulation requirements.

Figure 13A:
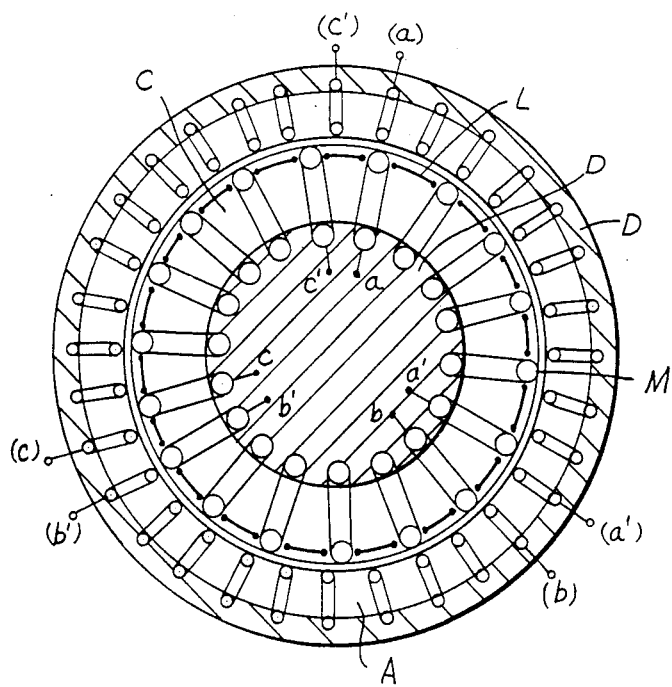
FIG. 13a shows a stator or a rotor winding.
Figure 13B:
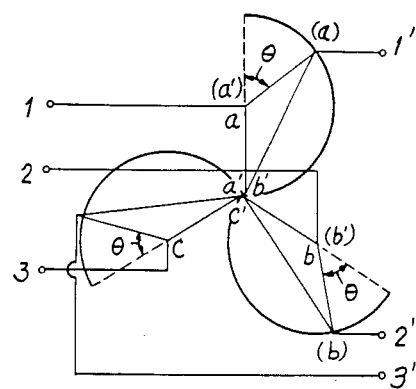
FIG. 13b is a vector diagram for a three-pole three-phase induced-voltage regulator in accordance with the invention.

FIG. 13(a) shows a three-pole three-phase array unit in which an induced voltage regulation is shown. In FIG. 13(a), element A is a stator and element C is a rotor. The stator and the rotor winding are of the main ring type winding (M) and short circuit drum winding (L). Also the stator and the rotor become a lumped winding simply at 120° electrical angle intervals. In order to prevent flux leakage, non-magnetic materials and metals are used inside and outside of the core. The flux distortion of the airgap of the flux in the stator or the rotor is removed for the flux of the fundamental wave to be increased. Induced voltage is increased though not to be influenced in the main flux. Voltage regulation is possible by rotating the rotor. As shown in FIG. 13(b), if the winding of the stator (a), (a'), (b), (b'), and (c), (c') are connected with the rotor (a a', b b', c c') and the rotor rotated by applying a three-phase voltage to input terminal 1, 2 and 3, a voltage regulation can be obtained which controls the voltage of output terminal 1', 2' and 3'.

Figure 14:
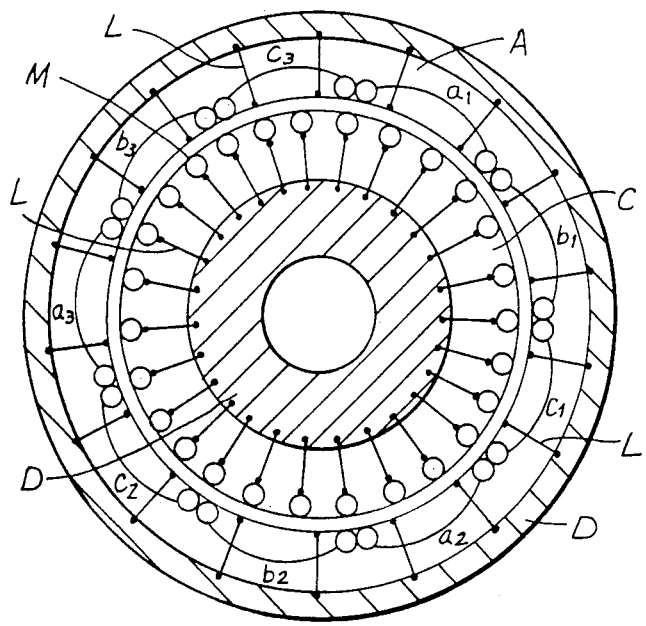
FIG. 14 shows the construction of a nine-pole three-phase induction motor in accordance with the invention.

In FIG. 14, a three-pole winding three-phase induction motor is shown. Element A is a stator, element C is a rotor. In the stator, as in FIG. 13, if a three-phase winding is wound on a three-pole stator at 120° electrical angle intervals, it becomes a nine-pole three-phase induction motor which is single lumped wound by three-pole×3=9 poles. In order to prevent flux leakage, non-magnetic materials and metals are used inside and outside of the core. If the rotating speed N=1200 (rpm) is generator, it is possible to obtain f=60 Hz in the frequency $f=(P_3/3)\times(N/60)$ ($P_3=9$). Also, if an electric source of 60 Hz is added to this electric motor, the frequency is the same as the former six-pole three-phase induction motor which becomes N=1,200 (rpm) from $N(rpm)=180f/P_3$. In the stator of this electric motor, if the coil is wound three turns to three-phase of a.b.c., the reactance in the A.C. machines is decreased, the reaction in the D.C. machines is reduced. The high frequency, which is included in the rectangular wave of the forceable magnetic field, is removed by the short-circuit ring coil (L). Thus, the magnetic field which is able to rotate can be rotated perfectly. Also, the short-circuit ring coil (L) can be associated with the stator and rotor core in order to eliminate the phase and waveform distortion in relation to the change of the airgap main flux. Thus, the output of this generator is increased as described in FIG. 1 and FIG. 3, and the torque of this motor can be increased as described in FIG. 2 or FIG. 4.

A short-circuit ring winding is used in the static magentic field of D.C. machines and in the rotating magnetic field A.C. machines and in the ring cores of induction motors and in synchronous machines. Therefore, they can reduce reactance in the A.C. machines and remove reaction in the D.C. machines. Non-magnetic materials are used outside and inside of the ring cores of all rotary machines.

What is claimed is:

1. Apparatus comprising rotor and stator means one of which is rotatable relative to the other, one of said means being a magnetized member and therefore having North and South poles, the other of said means comprising an armature, a first winding associated with at least one of said means and effecting a magnetic interaction between said rotor and stator means, a second winding at right angles to said first winding, said second winding being of closed loop configuration, and a non-magnetic means operatively positioned with respect to said second winding for cooperating therewith for the generating and positioning of counter flux for compensating armature reaction flux and thereby increasing efficiency, said rotor and stator means being concentric cylinders, the outer of which is a magnet and the inner of which is said armature, said first winding being a main coil wound on said armature, said non-magnetic means being associated with said armature, said first winding being of drum type, said armature being slotted to receive said main coil.

2. Apparatus as claimed in claim 1 wherein said non-magnetic means is incorporated in said armature.

3. Apparatus as claimed in claim 2 wherein said apparatus further comprises comprising a commutator coupled to said armature.

4. Apparatus comprising rotor and stator means one of which is rotatable relative to the other, one of said means being a magnetized member and therefore having North and South poles, the other of said means comprising an armature, a first winding associated with at least one of said means and effecting a magnetic interaction between said rotor and stator means, a second winding at right angles to said first winding, said second winding being of closed loop configuration, and a non-magnetic means operatively associated with at least one of said means and operatively positioned with respect to said second winding for cooperating therewith for the generating and positioning of counter flux for compensating armature reaction flux and thereby increasing efficiency, said rotor and stator means being concentric cylinders, the outer of which is a magnet and the inner of which is said armature, said first winding being a main coil wound on said armature, said non-magnetic means being associated with said armature, said first winding, said second winding and said non-magnetic means being an integral common body.

5. Apparatus as claimed in claim 4 wherein said main coil is of drum type.

6. Apparatus comprising rotor and stator means one of which is rotatable relative to the other, one of said means being a magnetized member and therefore having North and South poles, the other of said means comprising an armature, a first winding associated with at least one of said means and effecting a magnetic interaction between said rotor and stator means, a second winding at right angles to said first winding, said second winding being of closed loop configuration, and non-magnetic means operatively associated with at least one of said means and operatively positioned with respect to said second winding for cooperating therewith for the generating and positioning of counter flux for compensating armature reaction flux and thereby increasing efficiency, said closed loop of said second winding comprising a short-circuit loop coil which extends around said armature in a radial plane.

7. Apparatus comprising rotor and stator means one of which is rotatable relative to the other, one of said means being a magnetized member and therefore having North and South poles, the other of said means comprising an armature, a first winding associated with at least one of said means and effecting a magnetic interaction between said rotor and stator means, a second winding at right angles to said first winding, said second winding being of closed loop configuration, and a non-magnetic means operatively associated with at least one of said means and operatively positioned with respect to said second winding for cooperating therewith for the generating and positioning of counter flux for compensating armature reaction flux and thereby increasing efficiency, said armature being cylindrical and said non-magnetic means comprising a cylindrical member within said armature, said second winding including a plurality of coils of said closed loop configuration wound on said armature in radial planes, said first winding being a main coil of drum-type wound on said armature.

* * * * *